United States Patent
Wever et al.

(10) Patent No.: US 10,101,892 B2
(45) Date of Patent: Oct. 16, 2018

(54) METHOD, APPARATUS AND COMPUTER PROGRAM PRODUCT FOR PROVIDING INTERACTIVE SETTINGS AND DEPENDENCY ADJUSTMENTS

(71) Applicant: HERE GLOBAL B.V.

(72) Inventors: Pascal Wever, Los Angeles, CA (US); Charlie Sutton, San Francisco, CA (US); Brody Larson, San Mateo, CA (US); Sebastian Frey, Woodland Hills, CA (US); Maarten Hammendorp, Palo Alto, CA (US); Nicole Ryan, San Francisco, CA (US)

(73) Assignee: HERE Global B.V., Eindhoven (NL)

( * ) Notice: Subject to any disclaimer, the term of this patent is extended or adjusted under 35 U.S.C. 154(b) by 600 days.

(21) Appl. No.: 14/540,157

(22) Filed: Nov. 13, 2014

(65) Prior Publication Data
US 2016/0139738 A1 May 19, 2016

(51) Int. Cl.
 G06F 3/048 (2013.01)
 G06F 3/0484 (2013.01)
(52) U.S. Cl.
 CPC .............................. G06F 3/04847 (2013.01)
(58) Field of Classification Search
 CPC . G06F 3/0482; G06F 3/04847; G06F 3/04842
 See application file for complete search history.

(56) References Cited

U.S. PATENT DOCUMENTS

| | | | |
|---|---|---|---|
| 2003/0187671 A1* | 10/2003 | Kumhyr | G06Q 10/06 705/7.27 |
| 2003/0209246 A1* | 11/2003 | Schroeder | A61M 16/0808 128/204.17 |
| 2007/0113183 A1* | 5/2007 | Brinkmann | G06F 3/04847 715/723 |
| 2009/0109798 A1* | 4/2009 | West | G09B 23/281 368/10 |
| 2011/0265039 A1* | 10/2011 | Lyon | G06F 3/04855 715/830 |
| 2011/0309938 A1* | 12/2011 | Olsen | F25D 29/008 340/584 |
| 2013/0263046 A1* | 10/2013 | Takahashi | G06F 3/0484 715/788 |

(Continued)

OTHER PUBLICATIONS

Steve Litchfield, "Four Tutorials for Nokia Pro Camera That You Really Should Watch", published on Aug. 17, 2013 to http://allaboutwindowsphone.com/flow/item/18178_Four_tutorials_for_Nokia_Pro_C.php, retrieved on Nov. 25, 2016.*

(Continued)

Primary Examiner — Shourjo Dasgupta
(74) Attorney, Agent, or Firm — Alston & Bird LLP

(57) ABSTRACT

A method, apparatus and computer program product are provided for providing interactive settings and dependency adjustments to the settings. A user interface provides a user with the ability to configure device or application settings. Other dependent settings may change accordingly to a compatible setting while causing minimized impact to the use of the device or application. The user interface may be interactive such that visual indication of the changed dependent setting is provided to the user in an unobtrusive manner.

6 Claims, 4 Drawing Sheets

(56) References Cited

U.S. PATENT DOCUMENTS

2015/0324135 A1* 11/2015 Chan ................ G06F 3/061
　　　　　　　　　　　　　　　　　　　　　　　711/114
2016/0041899 A1* 2/2016 Cragun ............. G06F 3/04847
　　　　　　　　　　　　　　　　　　　　　　　714/38.1

OTHER PUBLICATIONS

"Using Nokia Pro Camera—ISO and Shutter Speed", published on Sep. 23, 2013 to https://blogs.windows.com/devices/2013/09/23/using-nokia-pro-camera-iso-and-shutter-speed/#VBAw3W6sGSVISXZC.97, retrieved on Nov. 25, 2016.*

Pro Camera Now Available for the Nokia Lumia 920, 925 and 928 [online] [retrieved Jan. 20, 2015]. Retrieved from the Internet: http://conversations.nokia.com/2013/08/15/pro-camera-now-available-for-the-nokia-lumia-920-925-and-928/ (dated Aug. 15, 2013) 9 pages.

\* cited by examiner

METHOD, APPARATUS AND COMPUTER PROGRAM PRODUCT FOR PROVIDING INTERACTIVE SETTINGS AND DEPENDENCY ADJUSTMENTS

TECHNOLOGICAL FIELD

An example embodiment of the present invention relates generally to a user interface for inputting device or application settings, and more particularly, to a method, apparatus and computer program product for providing interactive settings and dependency adjustments to the settings.

BACKGROUND

The development of modern computing technology has led to an increase in development of computer applications. Such applications relate to various types of technology used in every aspect of life. In many examples the applications are configurable such that a user may select preferences, settings, and/or the like to customize the application. As one example, a user may want to configure settings of a camera, such as to adjust the quality of video capture by setting the frames per second.

Settings relating to a camera or other application and/or components may include a complex intertwining of dependencies. For example, changing the frames per second may introduce limitations on the resolution at which the camera captures video, and/or may further impact available shutter speeds, for example. Numerous other settings may be dependent on one another. In current examples, users may be prompted via a user interface with error messages indicating the desired or input setting is incompatible with other settings, and that one setting or the other must be changed. The user must then revert back to a previous setting, or in some instances, navigate to a different menu or configuration screen to change the conflicting setting. As another example, the user may see a desired option disabled or grayed out and made unavailable for selection. The user must in some examples ascertain why the desired setting is unavailable, navigate to the appropriate menu or view to identify the dependent setting, and change the setting accordingly so that the desired other setting may be configured.

Because of the widespread availability of mobile devices, which may include relatively small display screens and/or limited user input components, displaying error messages may be intrusive to the user of the device. The user may become distracted and frustrated with numerous messages appearing on the device display as the user attempts to configure the device and/or application and perform a task with the device. Furthermore, navigation amongst numerous menus may provide for poor user experience.

BRIEF SUMMARY

A method, apparatus, and computer program product are therefore provided for providing interactive settings and dependency adjustments. Certain example embodiments described herein may provide for an efficient method of managing setting dependencies and indicating the dependencies to a user. An interactive yet intuitive user interface may enable a user to see dependent settings changing in lockstep with a currently modified setting. Changes based on dependency adjustments may therefore be inferred by the user, and in some example, the user may reverse a decision based on the indications of changes to dependent settings. In this regard, the user may revert a change to a setting so that all settings changed as a result are reset to previous values.

A method is provided in accordance with example embodiments that includes causing display of at least a first and second user interface component having a positional relationship. Each user interface component has a respective setting, current value, and a plurality of available value options, receiving an indication of a user input indicative of a change in the current value of a first setting. The method also includes identifying a second setting that is dependent on the first setting, determining that the current value of the second setting is incompatible with a new value of the first setting, determining a recommended value of the second setting based on the new selected value of the first setting, and causing a visual indication of a change in the current value of the second setting to the recommend value of the second setting.

In some embodiments, the visual indication of the change in the current value of the second setting to the recommend value of the second setting occurs while the user input indicative of the change in the current value of the first setting is provided. In some examples the method further includes receiving an indication of a user input to revert the change made to the first setting, and in response to receiving the indication of the user input indicative of the reversion of the first setting, causing the first and second settings to revert to previous values.

In some embodiments, the indication of a user input to revert the change made to the first setting must be provided within a threshold amount of time from receiving the indication of the user input indicative of the change of the first setting. In some embodiments, the indication of a user input to revert the change made to the first setting is provided based on a pointing object remaining in contact with a touch screen display since receiving the indication of the user input indicative of the change of the first setting.

In another example embodiment, an apparatus is provided that includes at least one processor and at least one memory including computer program code with the at least one memory and computer program code configured to, with the processor, cause the apparatus to perform causing display of at least a first and second user interface component having a positional relationship. Each user interface component has a respective setting, current value, and a plurality of available value options. The at least one memory and computer program code are further configured for receiving an indication of a user input indicative of a change in the current value of a first setting, identifying a second setting that is dependent on the first setting, and determining that the current value of the second setting is incompatible with a new value of the first setting. The at least one memory and computer program code are further configured for determining a recommended value of the second setting based on the new selected value of the first setting, and causing a visual indication of a change in the current value of the second setting to the recommend value of the second setting.

In some embodiments, the visual indication of the change in the current value of the second setting to the recommend value of the second setting occurs while the user input indicative of the change in the current value of the first setting is provided. In some examples the at least one memory and computer program code are further configured to, with the processor, cause the apparatus to perform receiving an indication of a user input to revert the change made to the first setting, and in response to receiving the indication of the user input indicative of the reversion of the first setting, causing the first and second settings to revert to previous values.

In some embodiments, the indication of a user input to revert the change made to the first setting must be provided within a threshold amount of time from receiving the indication of the user input indicative of the change of the first setting. In some embodiments, the indication of a user input to revert the change made to the first setting is provided based on a pointing object remaining in contact with a touch screen display since receiving the indication of the user input indicative of the change of the first setting.

In a further example embodiment, a computer program product is provided that includes at least one non-transitory computer-readable storage media having computer-executable program code portions stored therein with the computer-executable program code portions including program code instructions configured for causing display of at least a first and second user interface component having a positional relationship. Each user interface component has a respective setting, current value, and a plurality of available value options, receiving an indication of a user input indicative of a change in the current value of a first setting. The program code instructions are further configured for identifying a second setting that is dependent on the first setting, determining that the current value of the second setting is incompatible with a new value of the first setting, determining a recommended value of the second setting based on the new selected value of the first setting, and causing a visual indication of a change in the current value of the second setting to the recommend value of the second setting.

In some embodiments, the visual indication of the change in the current value of the second setting to the recommend value of the second setting occurs while the user input indicative of the change in the current value of the first setting is provided. In some examples the computer-executable program code portions including program code instructions further configured for receiving an indication of a user input to revert the change made to the first setting, and in response to receiving the indication of the user input indicative of the reversion of the first setting, causing the first and second setting to revert to previous values.

In some embodiments, the indication of a user input to revert the change made to the first setting is provided within a threshold amount of time from receiving the indication of the user input indicative of the change of the first setting. In some embodiments, the indication of a user input to revert the change made to the first setting is provided based on a pointing object remaining in contact with a touch screen display since receiving the indication of the user input indicative of the change of the first setting.

In another example embodiment, an apparatus is provided with means for causing display of at least a first and second user interface component having a positional relationship. Each user interface component having a respective setting, current value, and a plurality of available value options, means for receiving an indication of a user input indicative of a change in the current value of a first setting. The apparatus may further include means for identifying a second setting that is dependent on the first setting, means for determining that the current value of the second setting is incompatible with a new value of the first setting, means for determining a recommended value of the second setting based on the new selected value of the first setting, and means for causing a visual indication of a change in the current value of the second setting to the recommend value of the second setting.

BRIEF DESCRIPTION OF THE DRAWINGS

Figure 1:
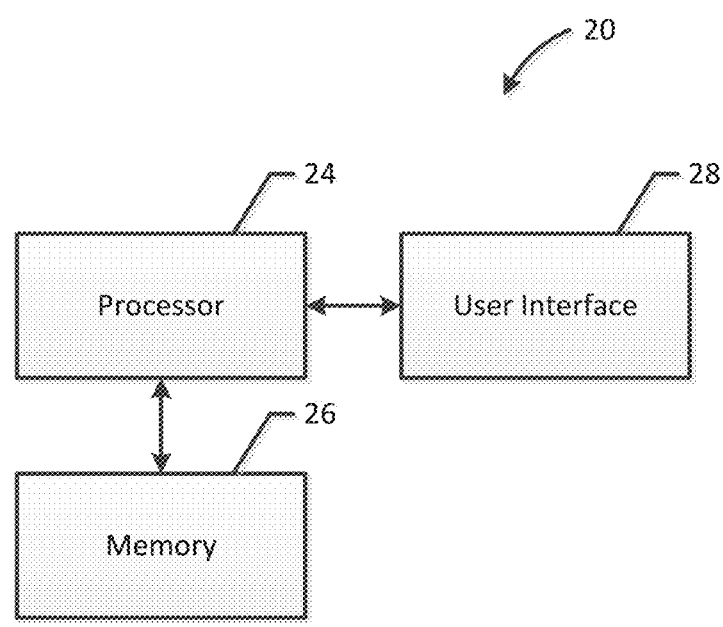
Figure 2:
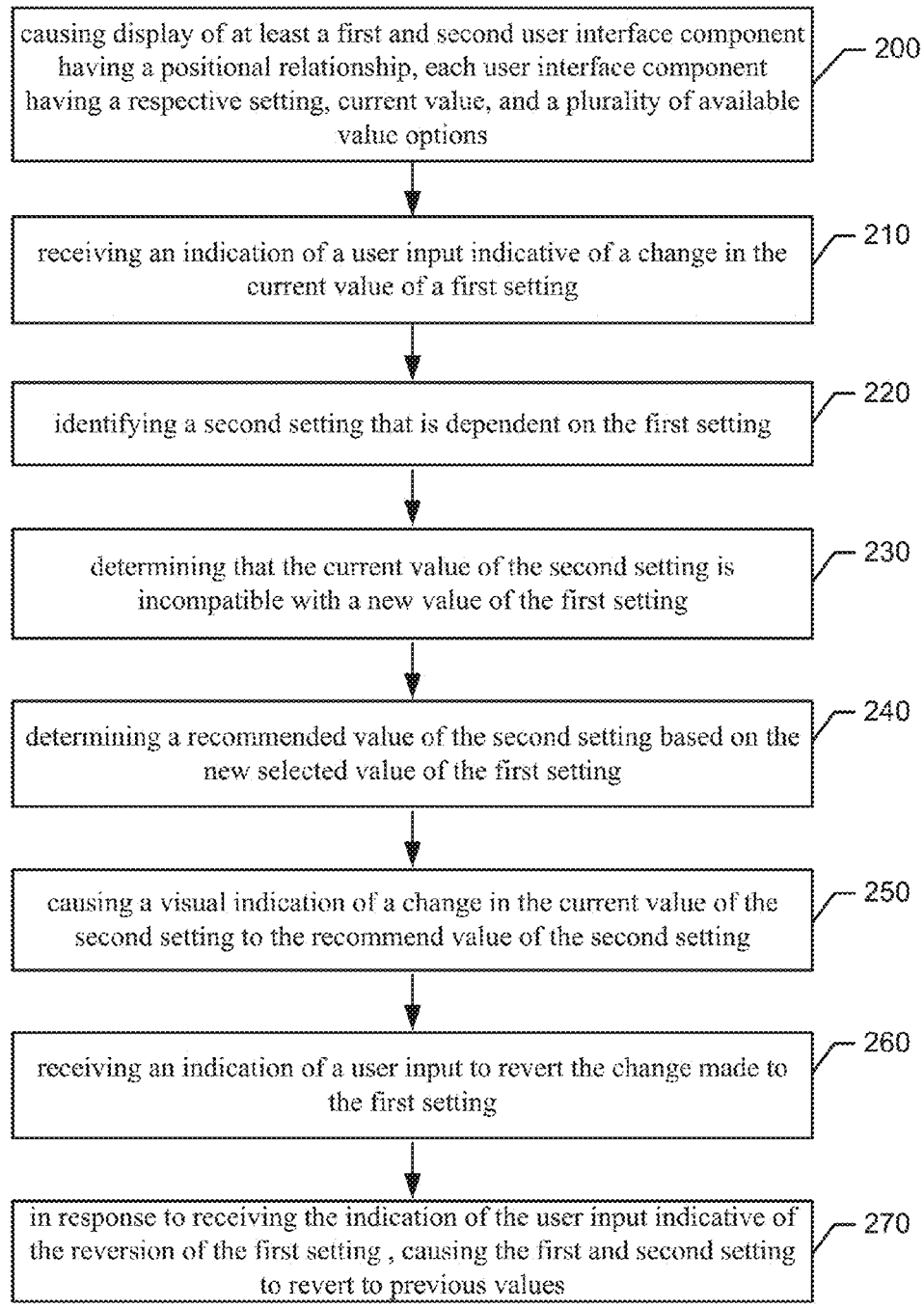

Having thus described certain example embodiments of the present invention in general terms, reference will hereinafter be made to the accompanying drawings which are not necessarily drawn to scale, and wherein:

FIG. 1 is a block diagram of an apparatus that may be configured to present a user interface in accordance with an example embodiment of the present invention;

FIG. 2 is a flowchart of operations for providing interactive settings and dependency adjustments to the settings according to an example embodiment; and FIGS. 3A-3K depicts example user interfaces according to example embodiments.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for providing interactive settings and dependency adjustments to the settings. In this regard, a user changing a setting of a device and/or application may be provided with visual indications in real-time that another setting dependent on the changed setting is impacted by the change. The functionality is provided by a user interface that may be unobtrusive to the task at hand. Although commonly referred to herein as a touch screen display, it will be appreciated that other user interfaces may be included in the embodiments provided herein. For example, a user may provide input to another type of display with movement of a mouse and/or cursor, and provide input with the mouse or other user interface controls.

FIG. 1 is a block diagram of an apparatus that may be configured to present a user interface in according with an example embodiment. The apparatus 20 of an example embodiment may be embodied by or associated with any of a variety of computing devices that include or are otherwise associated with a user interface that facilitates the provision of interactive settings and dependency adjustments. For example, the computing device may be a mobile terminal, such as a personal digital assistant (PDA), mobile telephone, smart phone, companion device, for example, a smart watch, pager, mobile television, gaming device, laptop computer, camera, tablet computer, touch surface, video recorder, audio/video player, radio, electronic book or any combination of the aforementioned, and other types of voice and text communications systems. Alternatively, the computing device may be a fixed computing device, such as a personal computer, a computer workstation, a kiosk or the like. Still further, the apparatus may be embodied by or associated with a plurality of computing devices that are in communication with or otherwise networked with one another such that the various functions performed by the apparatus may be divided between the plurality of computing devices that operate in collaboration with one another. For purposes of illustration, but not of limitation, an apparatus embodied by a mobile terminal 22, such as a smart phone, is depicted and will be described herein. However, the apparatus may be embodied by other types of computing devices as noted above.

The apparatus may include, be associated with or otherwise in communication with a processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like).

The apparatus 20 of an example embodiment may also optionally include a communication interface that may be any means such as a device or circuitry embodied in either hardware or a combination of hardware and software that is configured to receive and/or transmit data from/to other electronic devices in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

Referring now to FIG. 2, the operations performed, such as by the apparatus 20 of FIG. 2, in accordance with an example embodiment of the present invention are depicted. As shown by operation 200, the apparatus 20 may include means, such as the processor 24, the user interface 28 or the like, for causing display of at least a first and second user interface component having a positional relationship. Each user interface component of the illustrated embodiments has a respective setting, current value, and a plurality of available value options. In general, user interface component having a positional relationship may be aligned vertically or horizontally, for example.

Figure 3A:
Figure 3B:
Figure 3C:
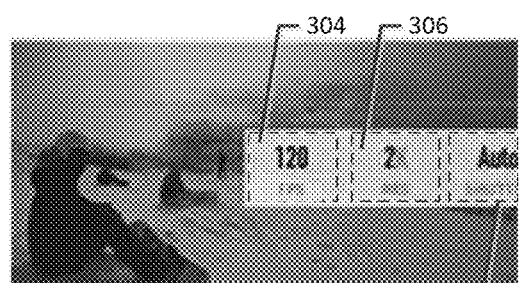
Figure 3D:
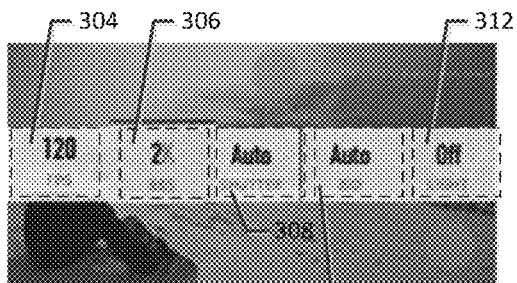

For example, see FIG. 3A which is an example user interface 28 that is a touch screen display of a mobile device comprising a camera. A camera mode and/or application is currently activated and the touch screen display provides a view finder for the camera application. When a user provides a touch input in the general location of indicator 300, and slides the pointing object (e.g., finger or stylus) left, a menu 302 gradually appears on the touch screen display, as shown in FIG. 3B, as if the user is sliding the menu onto the touch screen display from off screen. In this example, a first user interface component 304 provides a setting for frames per second (FPS) which is set to 30 FPS. A user may continue to slide out the menu 302, as shown in FIGS. 3C and 3D. FIG. 3C provides three user interface components 304, 306 and 308, each representative of a setting, and each having a positional relationship to one another. In this example, the user interface components are arranged horizontally. In FIG. 3D, the menu 302 is further slid to the left, revealing additional user interface components 310 and 312. At any point in time a user may release the touch input and the menu 302 may snap into place such that complete user interface components remain displayed, and those not yet displayed remain hidden. A user interface component having the majority displayed may snap into place such that the whole user interface component is visible.

The settings represented by the menu 302 in the illustrated example include FPS (represented by user interface component 304), resolution (represented by user interface component 306), shutter speed (represented by user interface component 308), ISO (sensitivity measurement, represented by user interface component 310), and light or camera flash (represented by user interface component 312). Each respective user interface component and setting also has a plurality of associated values to which the setting may be set. Table 1 provides example value options for each of the respective settings.

TABLE 1

| FPS | Resolution | Shutter Speed | ISO | Light |
|---|---|---|---|---|
| 180 | 1K | Auto | Auto | On |
| 120 | 2K | 1/16000 | 100 | Off |
| 30 | 4K | 1/8000 | 200 | |
| | | 1/5000 | 400 | |
| | | 1/250 | 800 | |
| | | 1/180 | 1000 | |
| | | 1/150 | | |
| | | 1/120 | | |
| | | 1/90 | | |
| | | 1/60 | | |
| | | 1/20 | | |

Figure 3E:
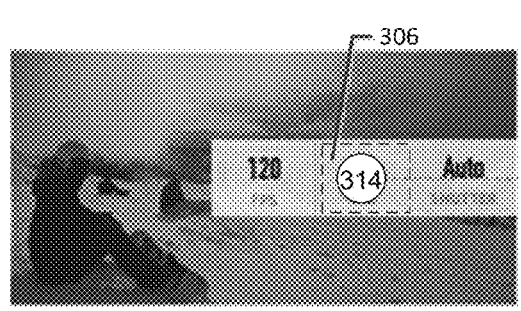
Figure 3F:
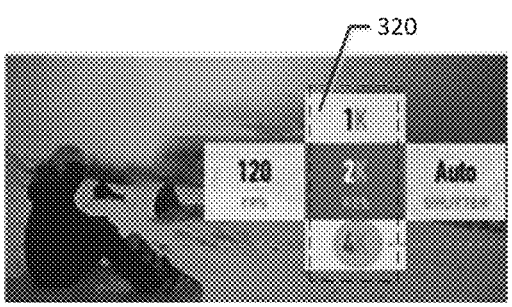

Returning to FIG. 2, as shown by operation 210, the apparatus 20 may include means, such as the processor 24, the user interface 28 and/or the like, for receiving an indication of a user input indicative of a change in the current value of a first setting. For example, as illustrated in FIG. 3E, a user may make a touch input with a pointing object to the user interface component 306 at indicator 314 to change the resolution. As depicted in FIG. 3F, a tumbler component 320 is displayed in response to the touch input, including a plurality of available value options for the setting. In some embodiments, all available value options, such as those listed in Table 1 may be displayed, or only a subset of the options may be displayed and a user may scroll or swipe through the available options in a logical order. As illustrated in FIG. 3F, a user may select a new value 4K for the resolution.

As shown by operation 220, the apparatus 20 may include means, such as the processor 24, memory 26 and/or the like, for identifying a second setting that is dependent on the first setting. Returning to the example in FIG. 3F, the frame frequency (FPS) may be dependent on the resolution. The memory 26 may therefore be configured to store dependency rules and/or information indicating which settings are dependent on others. For example, the resolution and frame frequency may both be dependent on each other, while the light or flash setting is not dependent on the resolution, for example.

As shown by operation 230, the apparatus 20 may include means, such as the processor 24, and/or the like, for determining that the current value of the second setting is incompatible with a new value of the first setting. In this example, the new selection 4K for the resolution is incompatible with the previously selected 30 FPS. The apparatus 20 may include dependency rules and information stored on memory 26, for example, defining what combinations of setting values are compatible.

For example, based on a 1K resolution, all available frame frequencies 180 FPS, 120 FPS, and 30 FPS are compatible. However, if the user changes the resolution to 2K, it is not possible for the camera to capture footage at 2K resolution at 180 FPS, so only the frame frequencies 120 FPS and 30 FPS may be used. Similarly, once the resolution changes to 4K, only 30 FPS may be used. Therefore, the apparatus 20 determines that the selected 4K resolution and 120 FPS is incompatible.

As shown by operation 240, the apparatus 20 may include means, such as the processor 24, and/or the like, for determining a recommended value of the second setting based on the new selected value of the first setting. In the example FIG. 3F, as the user changes the resolution to 4K, by selecting the value option 4K, the apparatus 20 identifies a compatible value for FPS while causing the least impact to the user. In this example scenario, the recommended value for FPS is determinable because it is the only compatible value available. As another example, if the user were changing the frame frequency from 30 FPS to 120 FS, while the resolution is set to 4K, the apparatus 20 may identify 1K or 2K as compatible resolutions. In such a scenario, the apparatus 20 may identify 2K as the recommended value of the setting because it results in the smallest change from 4K resolution, thereby causing the least impact to the user. In this regard, the memory 26 may also store information relating to a ranking and/or ordering of values for each respective setting, such that a compatible value resulting in the smallest change, or least impact to the user, may be easily identified.

Figure 3G:
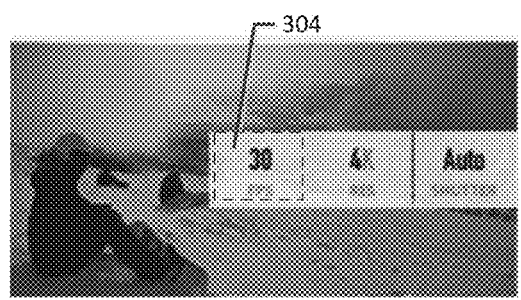

As shown by operation 250, the apparatus 20 may include means, such as the processor 24, the user interface 28 and/or the like, for causing a visual indication of a change in the current value of the second setting to the recommend value of the second setting. In the example of FIG. 3F, as the user changes the resolution to 4K, by selecting the value option 4K, the user interface component 304 reflects the change to the selected frame frequency, as shown in FIG. 3G. The FPS is therefore automatically changed to 30 FPS. The user may therefore see the change that is made as a direct result of the change to the resolution.

Figure 3H:
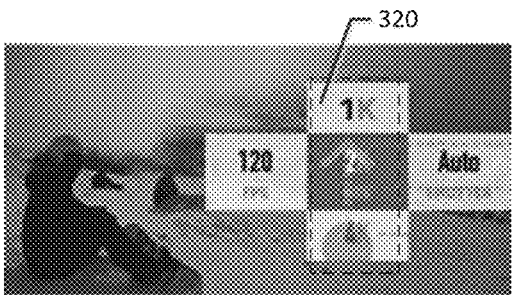
Figure 3I:
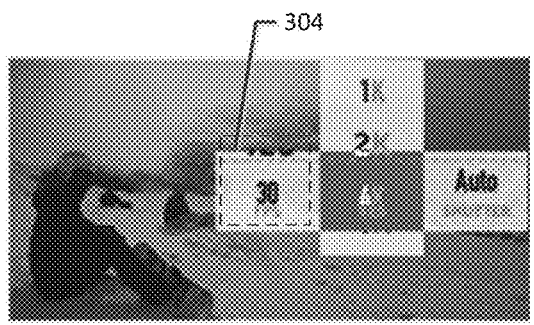

As yet another example, the visual indication of the change in the current value of the second setting to the recommend value of the second setting may occur while the user input indicative of the change in the current value of the first setting is provided. As shown in FIG. 3H, a user may select any portion of the tumbler component 320 and slide or drag the pointing object upward or downward on the touch screen display to scroll through the available values. As depicted in FIG. 3I, the dependent setting FPS may scroll in lockstep along with the resolution as shown by the scrolling user interface component 304. Such functionality provides a clear visual indication to the user that the FPS is dependent on the change to the resolution.

Figure 3J:
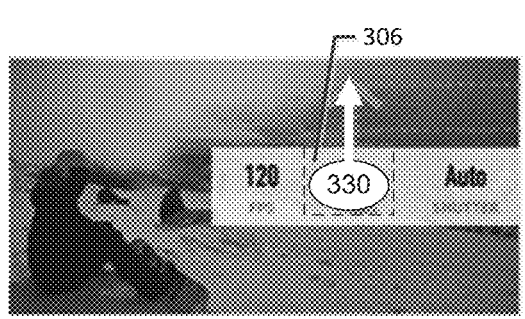
Figure 3K:
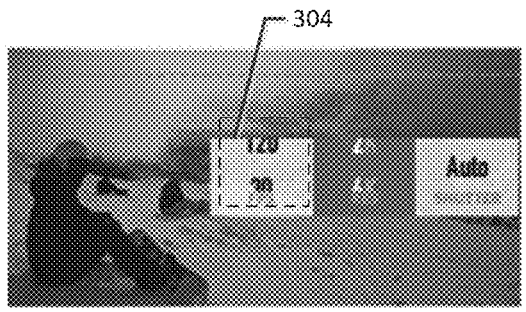

As yet another example, as shown in FIG. 3J a user may scroll through available value options of a user interface component without the user interface component expanding to a tumbler. The user touches the touch screen display at indicator 330 and moves the pointing object upward as indicated by the arrow. As is depicted in FIG. 3K, any dependent setting may scroll in lockstep with the scrolled user interface component and/or setting. Said differently, the compatible option of 120 FPS remains horizontally aligned with the compatible resolution 2K, and the two values scroll together to 30 FPS and 4K.

As shown by operation 260, the apparatus 20 may include means, such as the processor 24, the user interface 28 and/or the like, for receiving an indication of a user input to revert the change made to the first setting. In some examples, as a user sees a dependent value changing, the user may decide they do not want the change to the dependent or second setting to be made, and they may choose to revert the change to the first setting. The user therefore scrolls or swipes the first setting back to its original value.

As shown by operation 260, the apparatus 20 may include means, such as the processor 24, the user interface 28 and/or the like, for in response to receiving the indication of the user input indicative of the reversion of the first setting, causing the first and second settings to revert to previous values. In some embodiments, the apparatus 20 may detect that the user wishes to undo the changes, and therefore, as the user scrolls or swipes the first setting back to its original value, the dependent or second setting also reverts back to a previous value.

In some embodiments, it may be beneficial for the apparatus 20 to distinguish when the user is reverting a setting or merely continuing to configure the settings. Therefore, a reversion of a setting value may be detected, for example, based on the change to a previous value occurring within a threshold amount of time of the original change, such as 2 seconds, for example. As another example, if the pointing object (e.g., finger or stylus) remains in contact with the touch screen display between the time the use provides the original input or change to a setting, and the reversion, the apparatus 20 may identify the reversion as intentional.

As another example, the apparatus may determine that an input by a user is not intended to be a reversion of a setting. In some examples, the apparatus 20 may detect that a revertible status to a setting change has change from revertible to non-revertible. The revertible state may change from revertible to non-revertible if a specific event occurs, such as an elapse of a threshold period of time. For example, in one scenario a user makes a change to a first setting that triggers a change to a dependent setting. An initial revertible state may be associated with the change. Following the change, a threshold amount of time may elapse (such as 5 seconds, for example), and as a result, the revertible status of the change is switched to non-revertible. Therefore, following the status change, if a user changes the first setting back to its original value, the apparatus 20 determines based on the non-revertible state, that the previously changed dependent settings does not revert back along with the first settings. There may be exceptions to this scenario, such as when the dependency rules require that that dependent setting change.

As yet another example of an event that may cause the revertible status to change from revertible to non-revertible may include an operation of the application or component, such as capture of media. As another example, the pointing object being removed from the display may result in changing the revertible status from revertible to non-revertible. In such examples, a revertible status of non-revertible may indicate that the input by the user is not intended to be a reversion or undo operation, but rather the user is continuing to operate the device as desired. In this example, as described above, a second or dependent setting may not necessarily be reverted along with the user-provided change. If the dependency rules require that a second setting or dependent setting is changed, then the second setting or dependent will be changed based only on the dependency rule, and not because of a detected reversion of the first setting.

As such, the method, apparatus and computer program product provide numerous technical advantages. For example, providing visual indications of setting dependencies and corresponding changes enable a user to continue using an application and/or device with minimized interruption. Embodiments may limit the required navigation by the user and number of different setting menus, pages, and/or the like to access in order to configure the settings as desired. Furthermore, embodiments may provide conservation of processing resources and the associated power consumption otherwise expended to support the display of the complex navigation and/or error messaging to the user.

In addition to supporting user interaction with a user interface for configuring camera settings, the computing device may be configured to support interactive settings and dependency adjustments to settings for other device components, applications, and/or the like. For example, the computing device of an example embodiment may also support a mapping application so as to present maps or otherwise provide mapping information. In order to support a mapping application, the computing device may include or otherwise be in communication with a geographic database, such as may be stored in memory 26. For example, the geographic database includes node data records, road segment or link data records, point of interest (POI) data records, and other data records, More, fewer or different data records can be provided. In one embodiment, the other data records include cartographic ("carto") data records, routing data, and maneuver data. One or more portions, components. areas. layers, features, text, and/or symbols of the POI or event data can be stored in, linked to, and/or associated with one or more of these data records. For example, one or more portions of the POI, event data, or recorded route information can be matched with respective map or geographic records via position or global positioning system (UPS) data associations (such as using known or future map matching or geo-coding techniques), for example.

In example embodiments, the road segment data records are links or segments representing roads, streets, or paths, as can be used in the calculated route or recorded route information for determination of one or more personalized routes, according to example embodiments. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the computing device, for example. The navigation-related functions can correspond to vehicle navigation, pedestrian navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the server side geographic database can be a master geographic database, but in alternate embodiments, the client side geographic database can represent a compiled navigation database that can be used in or with the computing device to provide navigation and/or map-related functions. For example, the geographic database can be used with the end user device to provide an end user with navigation features. In such a case, the geographic database can be downloaded or stored on the computing device, such as in applications, or the computing device can access the geographic database through a wireless or wired connection (such as via a server and/or a communication network), for example.

In one embodiment, the computing device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display.

Thus, in addition to providing interactive settings and adjustments to dependency settings for camera settings as described above, the user can use the computing device of an example embodiment for navigation and map functions such as guidance and map display, for example. Navigation and mapping settings having preconfigured dependencies may include but are not limited to base map types (e.g., street view, satellite, imagery, topography), travel type (e.g., car, pedestrian, public transit), and special circumstance settings such as avoiding construction areas or toll roads. For example, the navigation and mapping application may not allow a user to configure the settings to avoid toll roads while in a pedestrian mode, since tolls typically do not apply to pedestrians. The above settings are provided merely as examples and it will be appreciated many other settings and/or setting dependencies may exist. The functionality provided by the apparatus 20 as described herein may be applied to a variety of device components and/or applications.

As described above, FIG. 2 illustrates a flowchart of an apparatus 20, method and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    causing display of at least a first and second user interface component having a positional relationship, each user interface component having a respective setting with a first value in a plurality of available value options;
    receiving an indication of a first user input indicative of a change for the respective setting of the first user interface component from the first value to a second value in the plurality of available value options;
    identifying that the respective setting of the second user interface component is dependent on the respective setting of the first user interface component;
    determining that the first value of the respective setting of the second user interface component is incompatible with the second value of the respective setting of the first user interface component;
    determining a recommended second value of the respective setting of the second user interface component based on the second value of the respective setting of the first user interface component;
    causing a visual indication of a change from the first value of the respective setting of the second user interface component to the recommended second value; and
    receiving an indication of a second user input to change the respective setting of the first user interface component from the second value to the first value;
    wherein in response to the indication of the second user input being received within a predefined threshold of time after the indication of the first user input, automatically reverting the respective setting of the second user interface component from the recommended second value to the first value; and
    wherein in response to the indication of the second user input to being received beyond the predefined threshold of time after the indication of the first user input, causing the respective setting of the second user interface component to remain at the recommended second value.

2. The method according to claim 1, wherein the visual indication of the change from the first value of the respective setting of the second user interface component to the recommended second value occurs while the indication of the first user input is provided.

3. An apparatus comprising at least one processor and at least one memory including computer program code, the at least one memory and the computer program code configured to, with the processor, cause the apparatus to perform at least:
    causing display of at least a first and second user interface component having a positional relationship, each user interface component having a respective setting with a first value in a plurality of available value options;
    receiving an indication of a first user input indicative of a change for the respective setting of the first user interface component from the first value to a second value in the plurality of available value options;
    identifying that the respective setting of the second user interface component is dependent on the respective setting of the first user interface component;
    determining that the first value of the respective setting of the second user interface component is incompatible with the second value of the respective setting of the first user interface component;
    determining a recommended second value of the respective setting of the second user interface component based on the second value of the respective setting of the first user interface component; and causing a visual indication of a change from the first value of the respective setting of the second user interface component to the recommended second value; and receiving an indication of a second user input to change the respective setting of the first user interface component from the second value to the first value;

wherein in response to the indication of the second user input being received within a predefined threshold of time after the indication of the first user input, automatically reverting the respective setting of the second user interface component from the recommended second value to the first value; and wherein in response to the indication of the second user input to being received beyond the predefined threshold of time after the indication of the first user input, causing the respective setting of the second user interface component to remain at the recommended second value.

4. The apparatus according to claim 3, wherein the visual indication of the change from the first value of the respective setting of the second user interface component to the recommended second value occurs while the indication of the first user input is provided.

5. A computer program product comprising at least one non-transitory computer-readable storage medium having computer-executable program code instructions stored therein, the computer-executable program code instructions comprising program code instructions for:

causing display of at least a first and second user interface component having a positional relationship, each user interface component having a respective setting with a first value in a plurality of available value options;

receiving an indication of a first user input indicative of a change for the respective setting of the first user interface component from the first value to a second value in the plurality of available value options;

identifying that the respective setting of the second user interface component is dependent on the respective setting of the first user interface component;

determining that the first value of the respective setting of the second user interface component is incompatible with the second value of the respective setting of the first user interface component;

determining a recommended second value of the respective setting of the second user interface component based on the second value of the respective setting of the first user interface component; and causing a visual indication of a change from the first value of the respective setting of the second user interface component to the recommended second value; and receiving an indication of a second user input to change the respective setting of the first user interface component from the second value to the first value;

wherein in response to the indication of the second user input being received within a predefined threshold of time after the indication of the first user input, automatically reverting the respective setting of the second user interface component from the recommended second value to the first value; and wherein in response to the indication of the second user input to being received beyond the predefined threshold of time after the indication of the first user input, causing the respective setting of the second user interface component to remain at the recommended second value.

6. The computer program product according to claim 5, wherein the visual indication of the change from the first value of the respective setting of the second user interface component to the recommended second value occurs while the indication of the first user input is provided.

* * * * *